US012505242B2

(12) United States Patent
Chen et al.

(10) Patent No.: US 12,505,242 B2
(45) Date of Patent: Dec. 23, 2025

(54) METHOD AND NON-TRANSITORY COMPUTER-READABLE STORAGE MEDIUM AND APPARATUS FOR PROGRAMMING AND RECOVERING PROTECTED DATA

(71) Applicant: Silicon Motion, Inc., Zhubei (TW)

(72) Inventors: Ching-Hung Chen, Kaohsiung (TW); Chiu-Han Chang, Taipei (TW)

(73) Assignee: Silicon Motion, Inc., Zhubei (TW)

( * ) Notice: Subject to any disclaimer, the term of this patent is extended or adjusted under 35 U.S.C. 154(b) by 189 days.

(21) Appl. No.: 18/417,262

(22) Filed: Jan. 19, 2024

(65) Prior Publication Data
US 2025/0200202 A1 Jun. 19, 2025

(30) Foreign Application Priority Data
Dec. 18, 2023 (CN) .......................... 202311751364.9

(51) Int. Cl.
*G06F 21/62* (2013.01)
*G11C 16/10* (2006.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| 9,112,863 | B2* | 8/2015 | Gnech | H04L 63/0838 |
| 10,083,325 | B2* | 9/2018 | Angus | H04L 9/0822 |
| 10,362,011 | B2 | 7/2019 | Lee et al. | |
| 10,963,582 | B1* | 3/2021 | McCown | G06F 21/602 |
| 11,470,055 | B2* | 10/2022 | Tyson | H04L 9/0861 |
| 11,494,352 | B1* | 11/2022 | Iyer | G06F 16/248 |
| 11,552,801 | B2* | 1/2023 | Kim | G06F 3/0673 |
| 12,058,259 | B2* | 8/2024 | Klapman | G06F 3/064 |

(Continued)

FOREIGN PATENT DOCUMENTS

| WO | WO 2018/014630 A1 | 1/2018 |
| WO | WO 2022/093242 A1 | 5/2022 |

*Primary Examiner* — Gary S Gracia
(74) *Attorney, Agent, or Firm* — Birch, Stewart, Kolasch & Birch, LLP

(57) ABSTRACT

The invention introduces a method for programming and recovering protected data. Protected data instructed by a data write command is received from a host side in multiple batches. After an encoding algorithm is used to generate an intermediate calculation result according to a first portion of the protected data, and an authentication key, multiple authentication calculation operations for remaining portions of the protected data, and multiple data programming operations for all portions of the protected data are arranged to enable the authentication calculation operations to be performed in parallel to the data programming operations. Each data programming operation is performed to program a corresponding portion of the protected data and a metadata associated with the corresponding portion of the protected data into a current block of a flash module. The metadata comprises information about whether the protected data has passed an authentication.

20 Claims, 13 Drawing Sheets

(56) References Cited

U.S. PATENT DOCUMENTS

| | | | |
|---|---|---|---|
| 2006/0282901 A1* | 12/2006 | Li | G06F 21/606 |
| | | | 726/26 |
| 2009/0198932 A1* | 8/2009 | Beaver | G06F 21/79 |
| | | | 711/E12.091 |
| 2011/0145475 A1* | 6/2011 | Eleftheriou | G06F 12/0246 |
| | | | 711/170 |
| 2011/0145930 A1* | 6/2011 | Gnech | H04L 63/10 |
| | | | 726/28 |
| 2013/0305061 A1* | 11/2013 | Yuan | G06F 21/602 |
| | | | 713/193 |
| 2015/0193342 A1* | 7/2015 | Ohara | G06F 12/0873 |
| | | | 711/120 |
| 2016/0253520 A1* | 9/2016 | Moon | G06F 21/6281 |
| | | | 713/190 |
| 2017/0262659 A1* | 9/2017 | Kuris | G06F 21/6227 |
| 2017/0329994 A1* | 11/2017 | Le Roy | G06F 21/64 |
| 2019/0130122 A1* | 5/2019 | Barnes | G06F 21/602 |
| 2019/0149329 A1 | 5/2019 | Wu et al. | |
| 2019/0199527 A1* | 6/2019 | Kuris | G06Q 10/00 |
| 2019/0310936 A1* | 10/2019 | Novogran | G06F 12/0868 |
| 2021/0081273 A1* | 3/2021 | Helmick | G06F 9/30189 |
| 2021/0200631 A1* | 7/2021 | Palmer | G06F 12/1408 |
| 2021/0336767 A1 | 10/2021 | Makaram et al. | |
| 2022/0014356 A1 | 1/2022 | Durham et al. | |
| 2022/0045850 A1* | 2/2022 | Ejiri | H04L 9/0643 |
| 2022/0164293 A1* | 5/2022 | Pearson | G06F 21/79 |
| 2023/0161715 A1* | 5/2023 | Lee | G06F 12/1441 |
| | | | 711/102 |
| 2023/0195913 A1* | 6/2023 | Qi | G06F 21/6218 |
| | | | 726/30 |
| 2023/0418603 A1* | 12/2023 | Grannaes | G06F 9/3816 |
| 2025/0200202 A1* | 6/2025 | Chen | G06F 21/6218 |

\* cited by examiner

METHOD AND NON-TRANSITORY COMPUTER-READABLE STORAGE MEDIUM AND APPARATUS FOR PROGRAMMING AND RECOVERING PROTECTED DATA

CROSS-REFERENCE TO RELATED APPLICATIONS

This application claims the benefit of priority to Patent Application No. 202311751364.9, filed in China on Dec. 18, 2023; the entirety of which is incorporated herein by reference for all purposes.

BACKGROUND

The disclosure generally relates to storage devices and, more particularly, to a method, a non-transitory computer-readable storage medium and an apparatus for programming and recovering protected data.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

The flash controller needs to check the security of protected data before programming the protected data into a flash module. If the protected data received from the host side does not pass authentication, the flash controller cannot program the protected data.

SUMMARY

In an aspect of the invention, an embodiment introduces a method for programming and recovering protected data, performed by a processing unit, to include the following steps: receiving protected data instructed by a data write command from a host side in a plurality of batches; and after using an encoding algorithm to generate an intermediate calculation result according to a first portion of the protected data, and an authentication key, arranging multiple authentication calculation operations for remaining portions of the protected data, and multiple data programming operations for all portions of the protected data, thereby enabling the authentication calculation operations to be performed in parallel to the data programming operations.

The authentication calculation operations are performed to calculate a message authentication code (MAC) using the encoding algorithm according to the intermediate calculation result, the remaining portions of the protected data and the authentication key. Each data programming operation is performed to program a corresponding portion of the protected data and a metadata associated with the corresponding portion of the protected data into a current block of a flash module. The metadata associated with the corresponding portion of the protected data comprises information about whether the protected data has passed an authentication, which is referred by a sudden power off recovery (SPOR) procedure.

In another aspect of the invention, an embodiment introduces a non-transitory computer-readable storage medium having stored therein program code that, when loaded and executed by a processing unit, causes the processing unit to perform the method for programming and recovering protected data as described above.

In still another aspect of the invention, an embodiment introduces an apparatus for programming and recovering protected data, to include: a host interface (I/F), coupled to a host side; a flash I/F, coupled to a flash module; and a processing unit, coupled to the host I/F and the flash I/F. The processing unit is arranged operably to: drive the host I/F to receive protected data instructed by a data write command from a host side in multiple batches; and after using an encoding algorithm to generate an intermediate calculation result according to a first portion of the protected data, and an authentication key, arrange the authentication calculation operations for remaining portions of the protected data, and the data programming operations for all portions of the protected data, thereby enabling the authentication calculation operations to be performed in parallel to the data programming operations.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
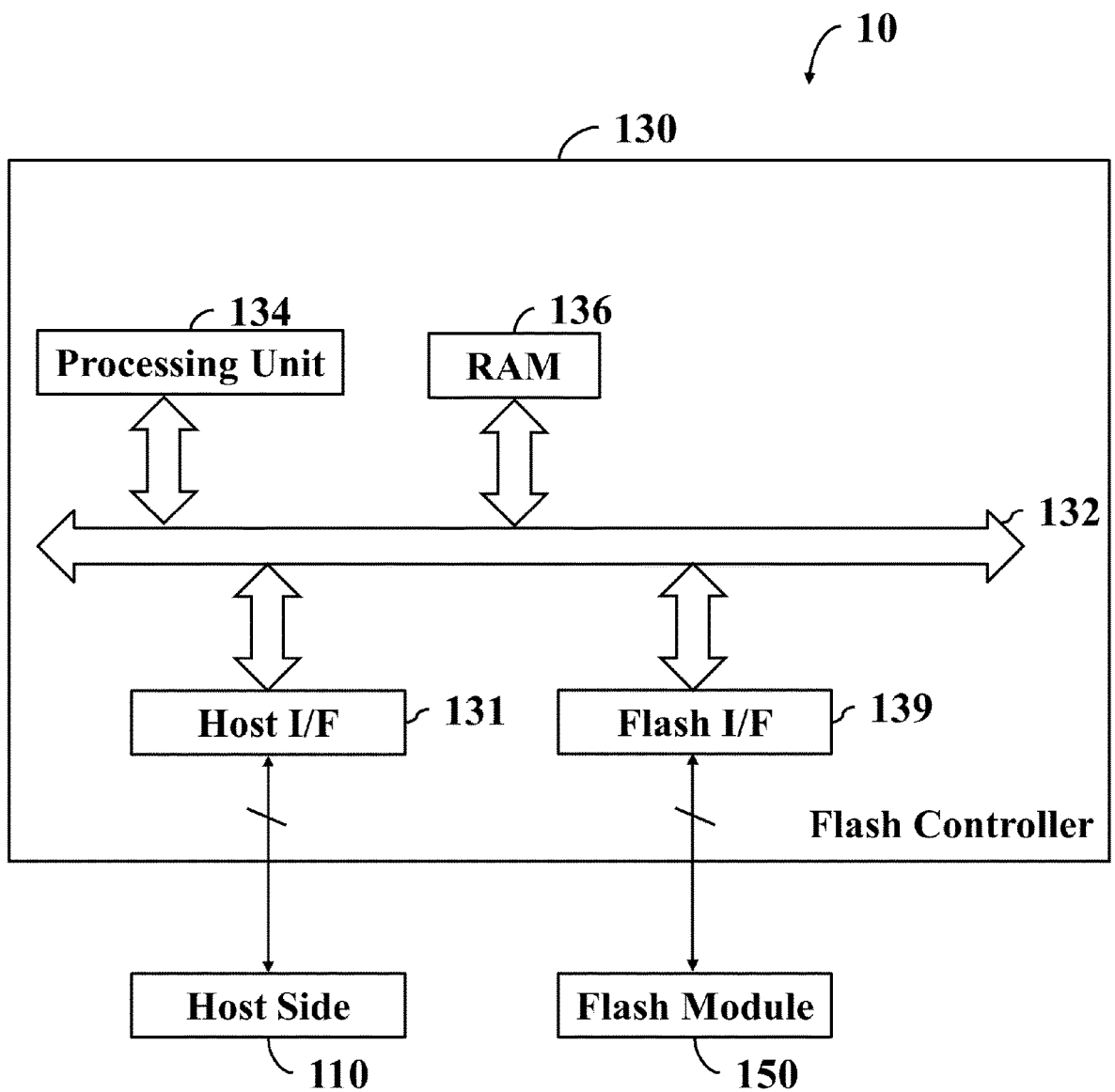
FIG. 1 is the system architecture of an electronic apparatus according to an embodiment of the invention.

Refer to FIG. 1. The electronic apparatus 100 includes the host side 110, the flash controller 130 and the flash module 150, and the flash controller 130 and the flash module 150 may be collectively referred to as a device side. The electronic apparatus 100 may be equipped with a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host interface (I/F) 131, such as write commands, read commands, discard commands, erase commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-address to flash-address mapping (H2F) tables, flash-address to host-address mapping (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
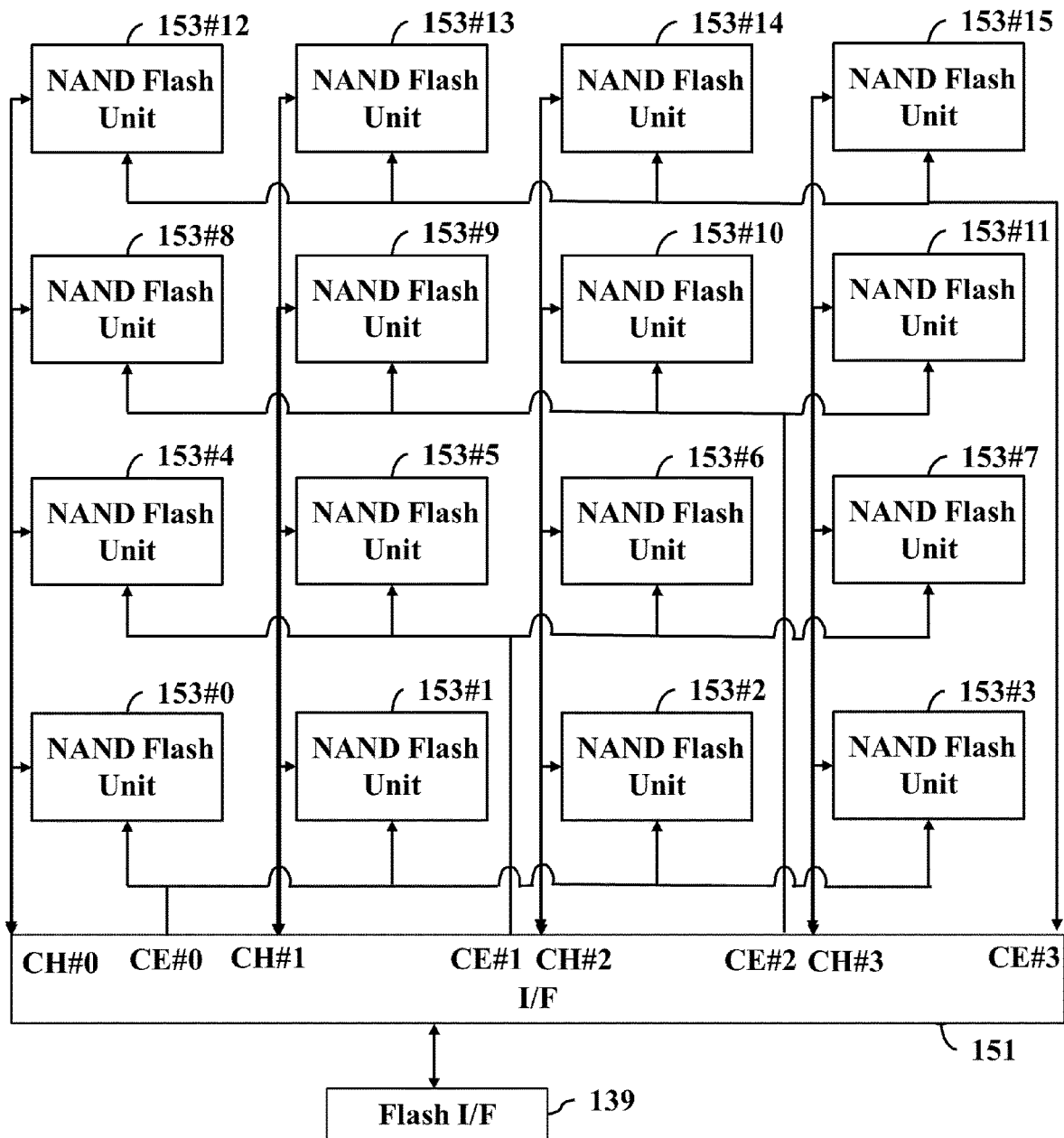
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
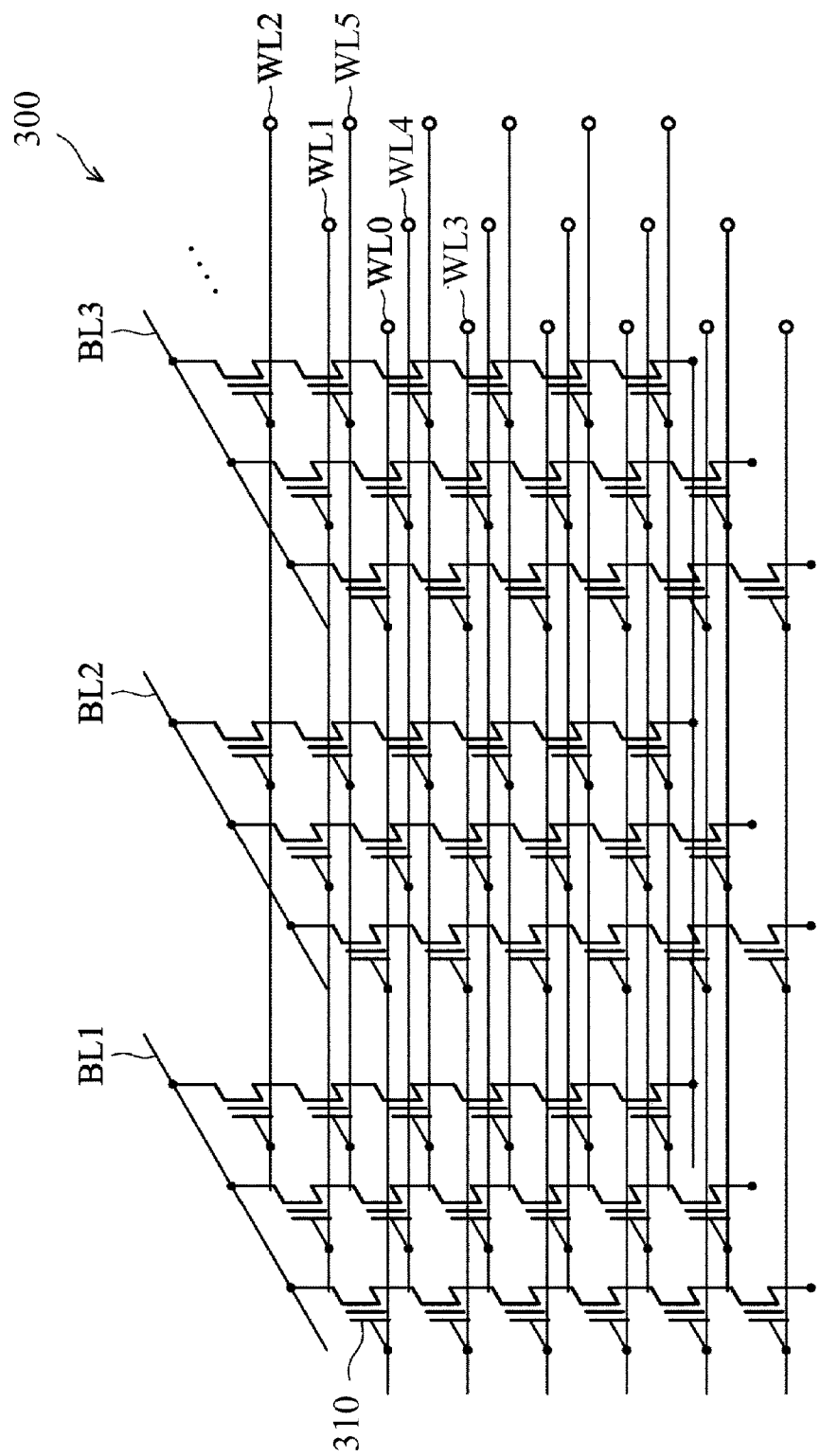
FIG. 3 is a schematic diagram showing the hardware architecture of a portion of a NAND flash unit according to an embodiment of the invention.

Refer to FIG. 3 showing the hardware architecture of a portion of a NAND flash unit. Each NAND flash unit may contain a plurality of memory blocks (e.g. the memory block 300) and the memory block 300 contains multiple memory units, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on the word lines WL0 to WL2 and WL3 to WL5 form two pages for storing data of two pages, respectively.

The host side 110 allocates a continuous range of logical block addresses (LBAs) for protected data and issues a special write command carrying any allocated LBA to the flash controller 130 to instruct the flash controller 130 to program the protected data of the carried LBA into the flash module 150. The flash controller 130 may store the protected data, such as the Replay Protected Memory Block (RPMB) data, the advanced RPMB data, etc., in the flash module 150. Since protected data is usually confidential or sensitive data, such as system information, key values used by the operating system (OS), etc., the protected data received from the host side 110 needs to be authenticated before being programmed into the flash module 150, or the protected data read from the flash module 150 needs to be authenticated before being replied to the host side 110. Once the authentication is passed, the flash controller 130 can program the received protected data into the flash module 150 or reply with the read protected data to the host side 110.

Taking advanced RPMB as an example, the host side 110 initially writes the authentication key into the designated region of the device side, such as the One Time Programming (OTP) area, which is 32 bytes in length, thereby enabling the device side to use the designated encoding algorithm (such as SHA128, SHA256, SHA512, etc.) with the authentication key to verify the protected data transmitted from the host side 110 in the future.

Figure 4:
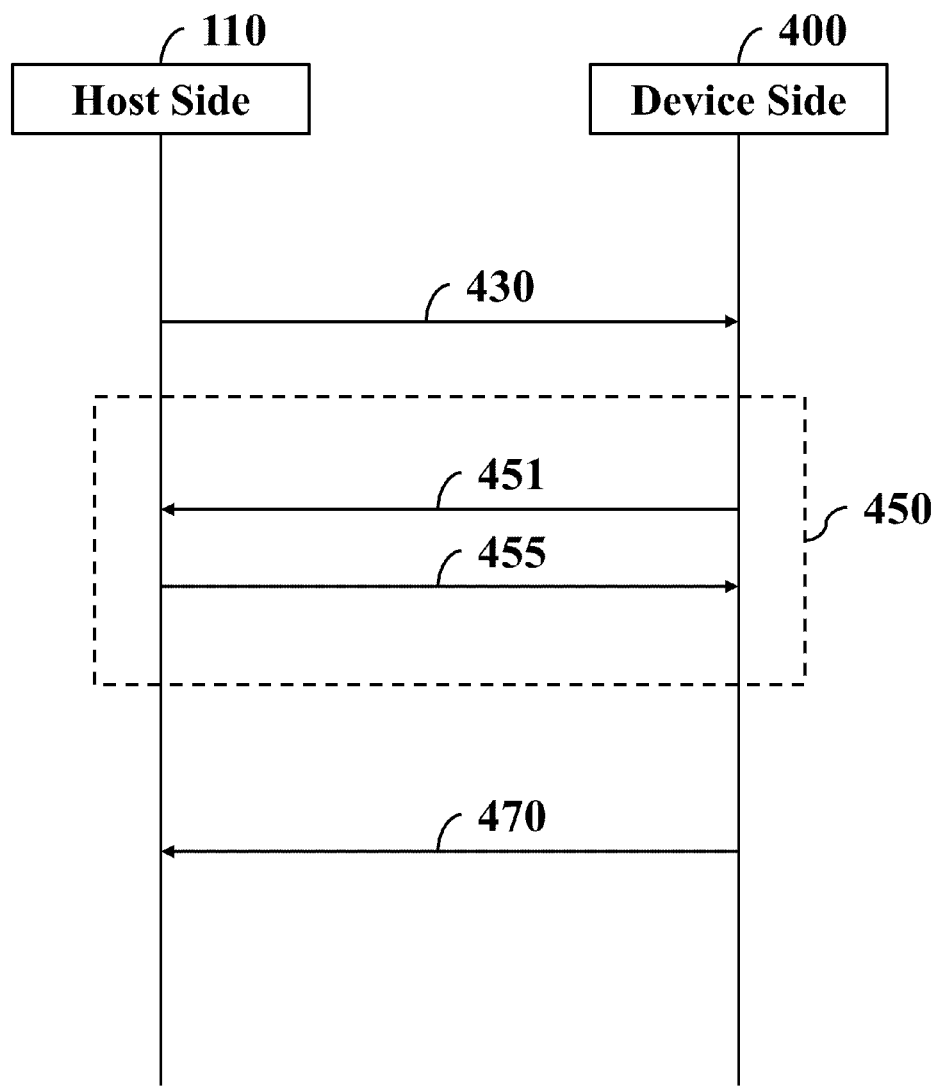
FIG. 4 is a sequence diagram for programming advanced Replay Protected Memory Block (RPMB) data according to an embodiment of the invention.

The host side 110 may use one authenticated data write command to program 64K or 128K bytes of protected data. Specifically, refer to FIG. 4 showing the sequence diagram for programming advanced RPMB data. The host side 110 may transmit the COMMAND UFS Protocol Information Unit (UPIU) 430 to the device side 400, which includes the operation code of "SECURITY PROTOCOL OUT" and the Extra Header Segment (EHS) field. The request type of the EHS field is the Authenticated Data Write Request "0003h". The EHS field includes the LBAs of the 64K bytes of protected data. The EHS field further includes 32 bytes of Message Authentication Code (MAC) that is used by the device side 400 to verity the forthcoming 64K bytes of RPMB data. The MAC is generated by the designated encoding algorithm (such as SHA128, SHA256, SHA512, etc.) with a verification key in accordance with the 64K bytes of protected data. The verification key is the same as the authentication key that is initially written into the device side 400. The device side 400 is ready to start receiving protected data after receiving the COMMAND UPIU 340 through the host I/F 131.

Once ready, a loop 450 is performed in coordination with the host side 110 and the device side 400 to enable the device side 400 to receive 64K bytes of protected data. In each iteration, the host I/F 131 may transmit the Ready To Transfer UFS Protocol Information Unit (RTT UPIU) 451 to the host side 110. The host side 110 transmits the DATA Out UFS Protocol Information Unit (UPIU) 455 to the device side 400 each time receiving the RTT UPIU 451, so that the host I/F 131 receives the 4K bytes of protected data carried in the DATA Out UPIU 455 and stores the received protected data in the data buffer therein.

Regardless of whether the device side 400 successfully programs the 64K bytes of protected data into the flash module 150, the host I/F 131 transmits the Response UFS Protocol Information Unit (UPIU) 470 to the host side 110, which includes the EHS field, after the device side 400 receives the 64K bytes of protected data corresponding to the COMMAND UPIU 430 successfully. The message type of the EHS filed is Authenticated Data Write Response "0300h".

In order to ensure the security of the protected data in 64K bytes, in some embodiments, the processing unit 134 executes computer instructions to implement the designated encoding algorithm (such as SHA128, SHA256, SHA512, etc.) to generate a MAC according to the received protected data and the authentication key in the OTP area. Subsequently, the processing unit 134 determines whether the MAC carried in the COMMAND UPIU 430 is the same as the MAC calculated by the designated encoding algorithm. If so, then the processing unit 134 determines that no part of the 64K bytes of protected data is missing or modified during transmission and the sender is a legitimate source, and drives the flash I/F to programmed the 64K bytes of protected data into the flash module 150. If not, then the processing unit 134 disallows the 64K bytes of protected data to be programmed into the flash module 150.

Each physical block in the flash module 150 is labeled as a current block or a data block according to its function. The processing unit 134 may select an empty physical block in each NAND flash unit as the current block for preparing to program the protected data received from the host side 110. In order to improve the efficiency of data programming, the protected data provided by the host side 110 is programmed in parallel into designated pages of multiple current blocks in multiple NAND flash units. The processing unit 134 maintains the F2H table for each current block. Each F2H table contains multiple records. Each record stores the information indicating which logical address of protected data or normal user data that is stored in one corresponding page of the corresponding current block. The records in the F2H table are stored in the order of the page numbers of physical pages in the corresponding current block. The logical address may be expressed in the logical block address (LBA) or other expression and is managed by the host side 110. The processing unit 134 may drive the flash I/F 139 to program the corresponding F2H table in the RAM 136 into the designated page (for example, the last page) of one current block or an empty page of another designated physical block after all pages of this current block are fully stored in data or the remaining pages of this current block are filled with dummy values. The current block is changed to the data block after the corresponding F2H table has been programmed into the flash module 150. In other words, data stored in the data block cannot be modified. It is to be noted that the current blocks across different NAND flash units are collectively referred to as one super-current block and the pages with the specific number, which are located across different NAND flash units, are collectively referred to as one super page. To simplify the explanation, the current block named in the following paragraphs may represent one or more current blocks in a super-current block across NAND flash units and the physical page named in the following paragraphs may represent one or more physical pages in a super page across NAND flash units.

Figure 5:
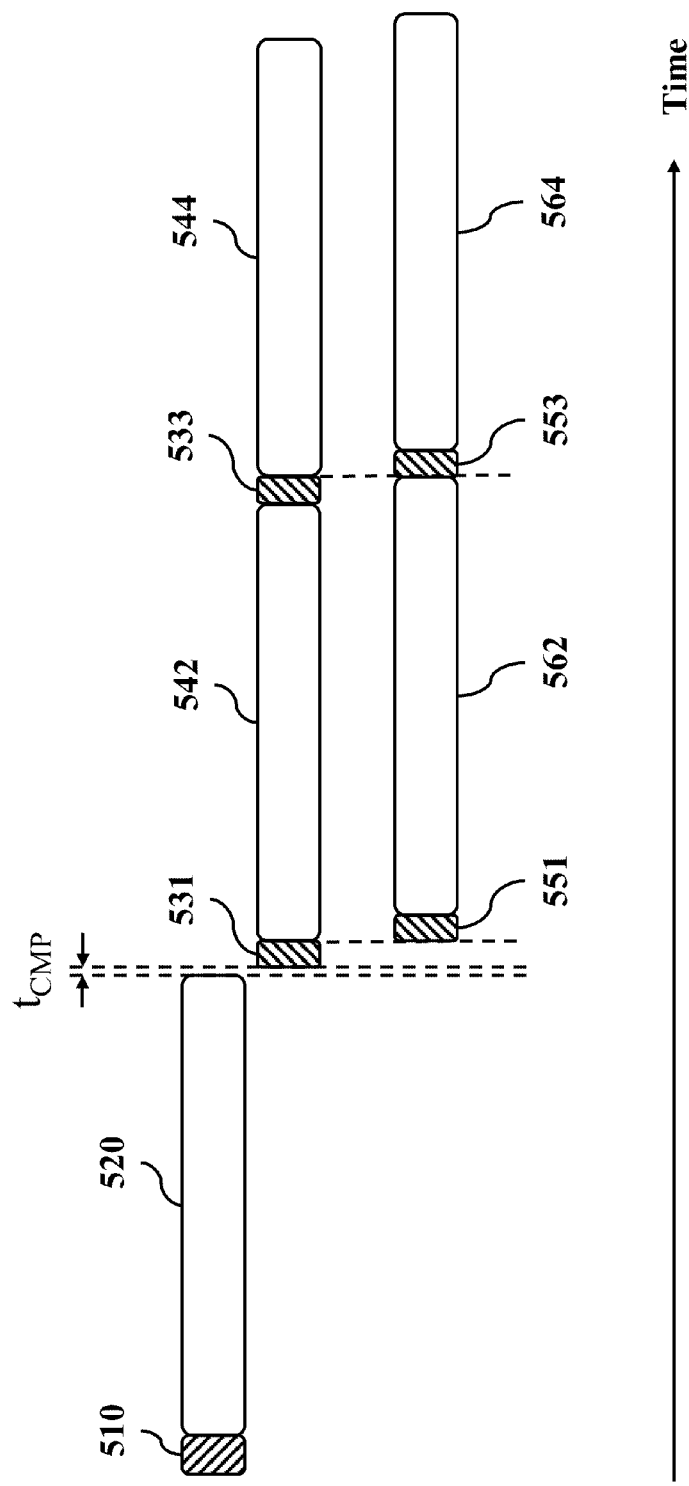
FIG. 5 is a schematic diagram for calculating a Message Authentication Code (MAC) and programming protected data independently according to some implementations.

Refer to FIG. 5 showing a schematic diagram for programming protected data in some implementations. The processing unit 134 drives the host I/F 131 to obtain the protected data and store the protected data in a designated address of the RAM 136 in the time period 510. In the time period 520, the processing unit 134 uses the designated encoding algorithm to generate a MAC according to the obtained protected data and the authentication key. Subsequently, the processing unit 134 compares the MAC sent from the host side 110 with the MAC calculated in the device side 400 in the time period temp. If they are the same, then the processing unit 134 can drive the flash I/F 139 to program the protected data into the flash module 150.

Assume that the processing unit 134 uses two I/O channels CH #0 and CH #1 to program the protected data into the flash module 150: The processing unit 134 drives the flash I/F 139 to transmit a portion of the protected data (for example, the first part thereof received in the time period 510) to the flash module 150 through the I/O channel CH #0 in the time period 531. After the time period 531, the processing unit 134 drives the flash I/F 139 to issue a command to the flash module 150 for starting an actual programming operation, which requires the time period 542, and drives the flash I/F 139 to transmit a portion of the protected data (for example, the second part thereof received in the time period 510) to the flash module 150 through the I/O channel CH #1 in the time period 551. After the time period 542, the processing unit 134 drives the flash I/F 139 to transmit a portion of the protected data (for example, the third part thereof received in the time period 510) to the flash module 150 through the I/O channel CH #0 in the time period 533. After the time period 533, the processing unit 134 drives the flash I/F 139 to issue a command to the flash module 150 for starting an actual programming operation, which requires the time period 544, and drives the flash I/F 139 to transmit a portion of the protected data (for example, the fourth part thereof received in the time period 510) to the flash module 150 through the I/O channel CH #1 in the time period 553. After the time period 553, the processing unit 134 drives the flash I/F 139 to issue a command to the flash module 150 for starting an actual programming operation, which requires the time period 564.

Figure 6:
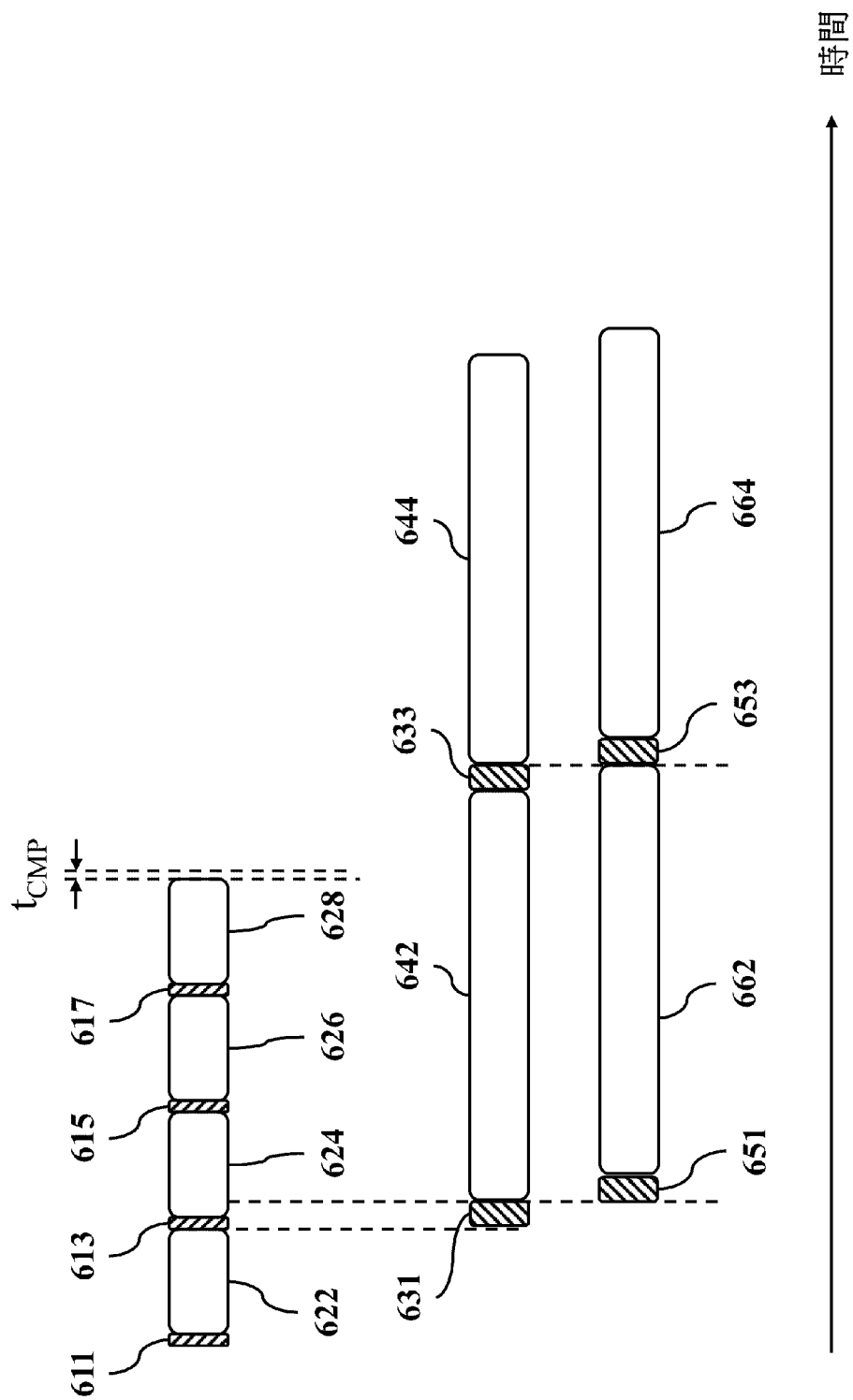
FIG. 6 is a schematic diagram for calculating a MAC and programming protected data in parallel according to an embodiment of the invention.

To shorten the programming time of the protected data as described above, an embodiment of the invention introduces a method for programming protected data, which enables the MAC calculation to be parallel to the actual programming of the protected data. Refer to FIG. 6 showing a schematic diagram for calculating a MAC and programming protected data in parallel. The processing unit 134 drives the host I/F 131 to obtain the protected data in four batches and stores the obtained protected data in a designated address of the RAM 136. For example, the processing unit 134 drives the host I/F 131 to obtain a portion of the protected data from the host side 110 in each of the time periods 611, 613, 615 and 617. After the time period 611, the processing unit 134 uses the designated encoding algorithm to generate an intermediate calculation result according to the obtained portion of the protected data and the authentication key in the time period 622. After the time period 613 or 615, the processing unit 134 uses the designated encoding algorithm to update the intermediate calculation result according to the newly obtained portion of the protected data, the newly updated intermediate calculated result and the authentication key in the time period 624 or 626. After the time period 617, the processing unit 134 uses the designated encoding algorithm to generate the MAC according to the newly obtained portion of the protected data, the newly updated intermediate calculated result and the authentication key in the time period 628. Subsequently, the processing unit 134 compares the MAC sent from the host side 110 with the MAC calculated in the device side 400 in the time period temp. If they are the same, then the processing unit 134 can drive the flash I/F 139 to program the protected data into the flash module 150. For example, the processing unit 134 obtains 16K bytes of the protected data through the host I/F 131 in any of the time periods 611, 613, 615 and 617. After the physical layer of the host I/F 131 completely collects 16K bytes of the protected data from the host side 110 and stores that in the data buffer of the host I/F 131, the DAM circuitry of the host I/F 131 stores the 16K bytes of the protected data from the data buffer in the designated address of the RAM 136 through the bus architecture 132. The 16K bytes of the protected data can be programmed into one physical page of the current block in the flash module 150. The entire 64K bytes of the protected data can be programmed into four physical pages of the designated current blocks in the flash module 150. To shorten the time for programming the protected data, the processing unit 134 instantly starts driving the flash I/F 139 to transmit the 16K bytes of the protected data (that was received in the time period 611) to the flash module 150 through the I/O channel CH #0 after the time period 622, and the transmission operation requires the time period 631. After the time period 631, the processing unit 134 instantly drives the flash I/F 139 to issue a command to the flash module 150 for starting the actual programming operation, which requires the time period 642, and instantly drives the flash I/F 139 to transmit the 16K bytes of the protected data (that was received in the time period 613) to the flash module 150 through the I/O channel CH #1, which requires the time period 651. After the time period 651, the processing unit 134 instantly drives the flash I/F 139 to issue a command to the flash module 150 for starting the actual programming operation, which requires the time period 662. The technical details of the operations performed in the time periods 633, 653, 644 and 664 are similar to that in the time periods 533, 553, 544 and 564, respectively, and are not repeated herein for brevity.

However, if the 64K bytes of the protected data is identified as illegal and a sudden power off (SPO) occurs after at least one 16K bytes of the protected data has been programmed into the flash module 150, then unexpected errors happen. The authentication result stored in the RAM 136 is gone when the SPO occurs, but the partial protected data that has been programmed into one or more physical pages is mistakenly kept in the subsequent sudden power off recovery (SPOR) procedure, resulting in a damage of the security. Although the specification describes the shortcomings of the above implementation, this is only used to illustrate the inspiration of embodiments of the present invention as follows. Those artisans can apply the technical solutions to solve other technical problems or be applicable to other technical environments, and the invention should not be limited thereto.

To address or alleviate the drawbacks produced in the embodiment as described above, the processing unit 134 receives protected data instructed by a data write command from the host side 110 through the host I/F 131 in multiple batches; and after using an encoding algorithm to generate an intermediate calculation result according to a first portion of the protected data, and an authentication key, arranges a plurality of authentication calculation operations for the remaining portion of the protected data, and a plurality of data programming operations for all portions of the protected data, thereby enabling the authentication calculation operations to be performed in parallel to the data programming operations. The authentication calculation operations are performed to calculate a MAC by using the same encoding algorithm according to the intermediate calculation result, the remaining portion of the protected data and the same authentication key. Each data programming operation is performed to program a corresponding portion of the protected data and its related metadata into one physical page of a current block in the flash module 150. The metadata includes information about whether the protected data has passed an authentication, which is referred by a SPOR procedure.

Figure 7:
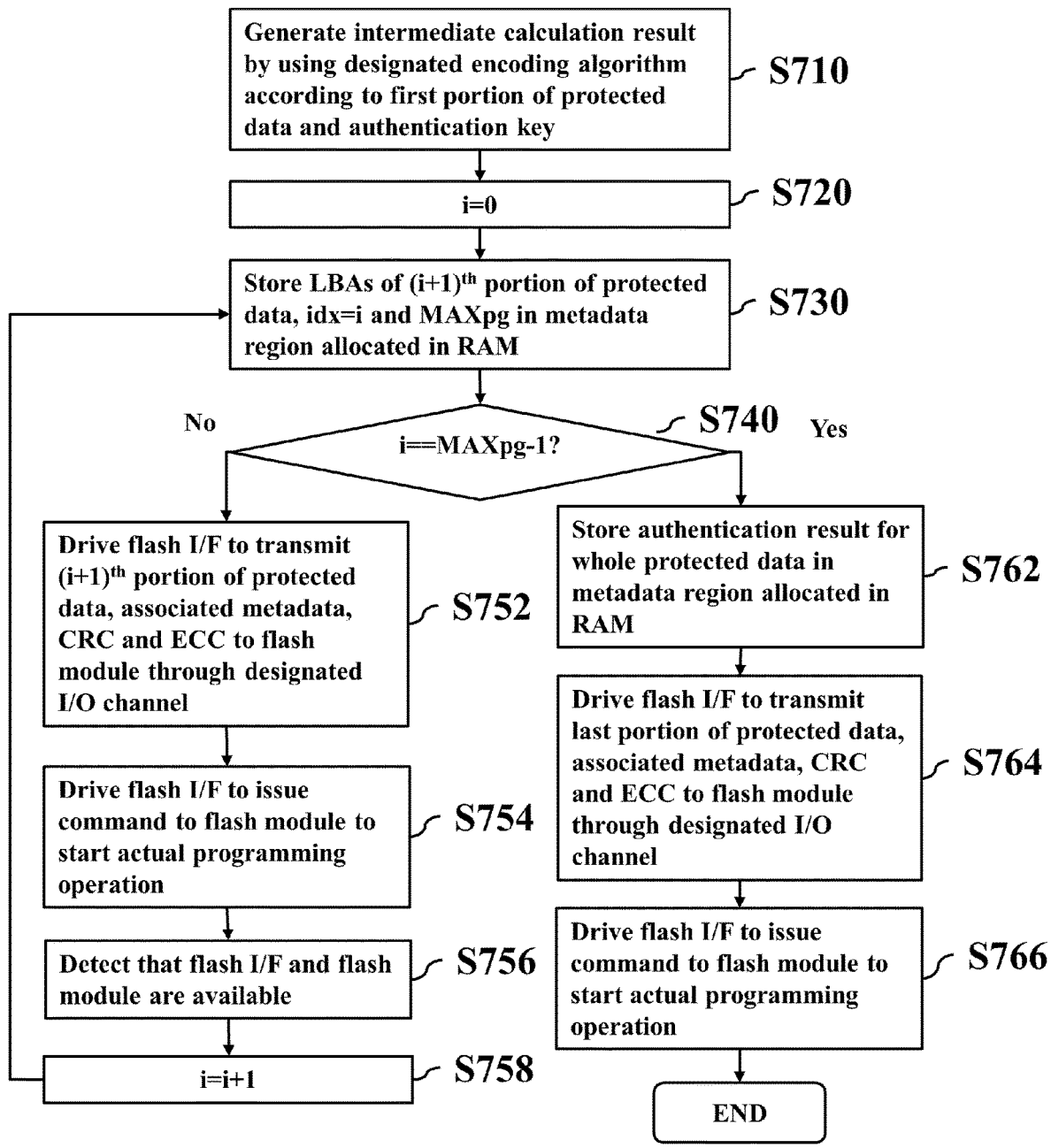
FIG. 7 is a flowchart illustrating a method for programming protected data according to an embodiment of the invention.
Figure 8:
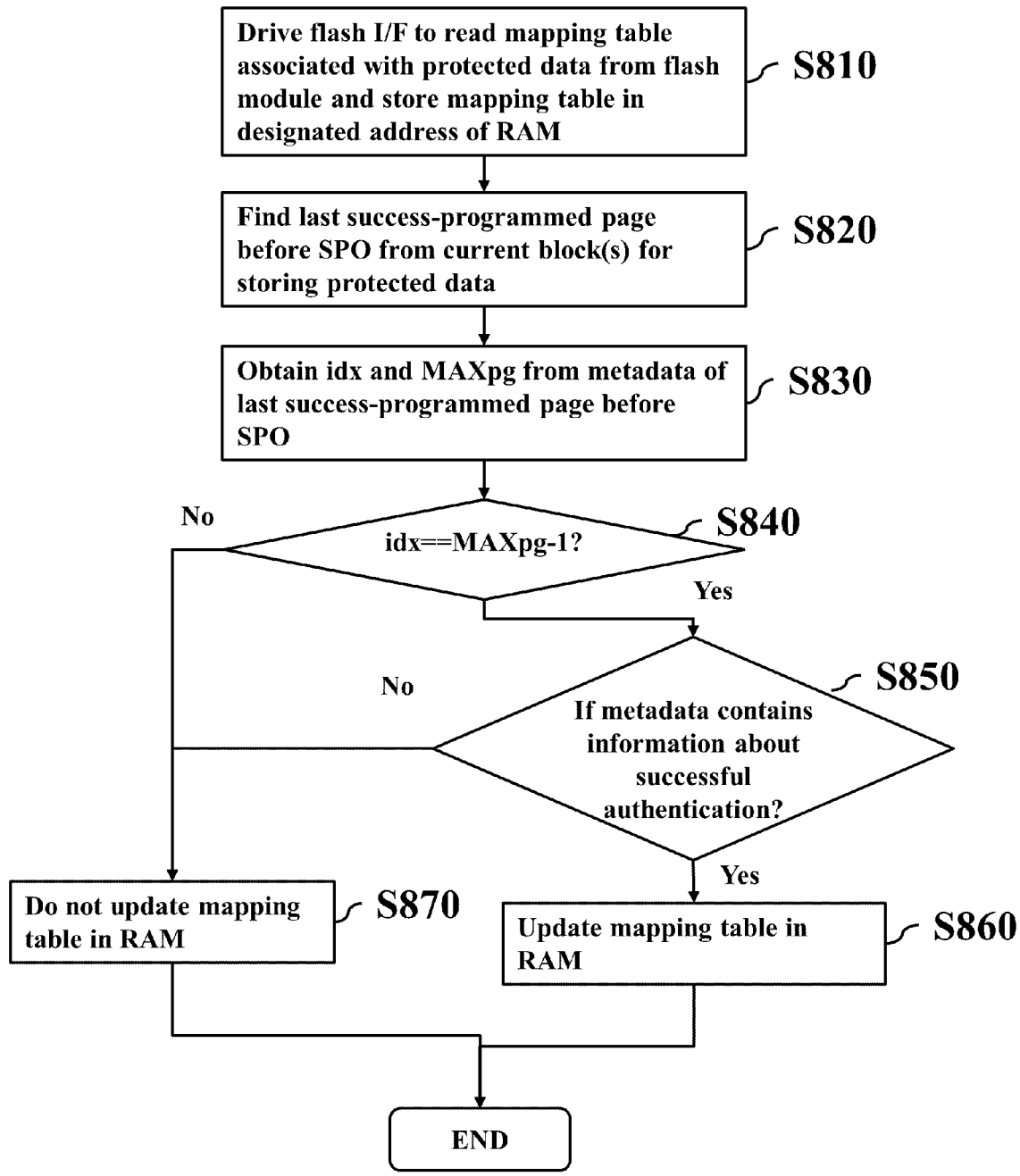
FIG. 8 is a flowchart illustrating a method for reconstructing protected data in a Sudden Power Off Recovery (SPOR) procedure, which is adapted to FIG. 7, according to an embodiment of the invention.

An embodiment of the invention introduces a method for programing protected data, as shown in FIG. 7, and a corresponding method for reconstructing the protected data in a SPOR procedure, as shown in FIG. 8. In addition to storing protected data, each physical page further reserves some space (for example, 96 bytes) for the processing unit 134 to store metadata, a Cyclic Redundancy Check (CRC) and an Error Check and Correction (ECC). The metadata is used to describe the protected data stored in this physical page. The metadata may include four LBAs of the protected data and each LBA indicates a logical address of the protected data in 4K bytes. In order to ensure the security of the protected data for one data write command (e.g. authenticated data write command), the processing unit 134 stores the total number of programmed pages and this page index in the metadata of each physical page. And, the metadata in the last physical page stores an authentication result for the entire protected data. The CRC is generated according to the protected data and the metadata stored in this physical page and is used to check whether the protected data and the metadata stored in this physical page have error bits. The ECC is generated according to the protected data and the metadata stored in this physical page and is used to correct a limited number of error bits appeared in the protected data and the metadata stored in this physical page. The ECC may be a Low-Density Parity Check Code (LDPC), a Bose-Chaudhuri-Hocquenghem (BCH) Code, or others.

Refer to the flowchart of the method for programming protected data, as shown in FIG. 7. The method is performed by the processing unit 134 when loading and executing program code of the Firmware Translation Layer (FTL). The details are as follows:

Step S710: An intermediate calculation result is generated by using the designated encoding algorithm in accordance with the first portion of the protected data, and the authentication key.

Step S720: The variable i is set to 0. The processing unit 134 uses the variable i to record the page index of the protected data corresponding to a data write command.

Step S730: The LBAs of the $(i+1)^{th}$ portion of the protected data, the page index idx=i, and the write page count MAXpg are stored in the metadata region allocated in the RAM 136. MAXpg is set to indicate a total number of physical pages that one data write command requires to program the protected data.

Step S740: It is determined whether the variable i equals the write page count MAXpg minus one. If so, it means that the physical page to be programmed in this iteration is the last physical page for this data write command (i.e. the data to be programmed in this iteration is the last portion of the protected data), and the process proceeds to step S762. Otherwise, the process proceeds to step S752.

Step S752: The flash I/F 139 is driven to transmit the $(i+1)^{th}$ portion of the protected data, the associated metadata, the associated CRC and the associated ECC to the flash module 150 through the designated I/O channel. It is to be noted that the metadata transmitted in this step does not contain the authentication result for the whole protected data. Moreover, the processing unit 134 may immediately jump to perform other tasks (for example, performing the designated encoding algorithm) without waiting for the actual transmission operation to be completed after driving the flash I/F 139.

Step S754: The flash I/F 139 is driven to issue a command to the flash module 150 to start the actual programming operation. It is to be noted that the processing unit 134 may immediately jump to perform other tasks (for example, performing the designated encoding algorithm) without waiting for the actual programming operation to be completed after driving the flash I/F 139. After the programming operation completes, the processing unit 139 updates the mapping table (i.e. the H2F table) temporarily stored in the RAM 136 to modify the physical address that is mapped for the LBAs of the $i^{th}$ portion of the protected data. The mapping table contains multiple records that store physical addresses mapped for a continuous range of LBAs in ascending order of LBAs.

Step S756: It is detected that the flash I/F 139 and the flash module 150 are available.

Step S758: The variable i is increased by one.

Step S762: The authentication result for the whole protected data is stored in the metadata region allocated in the RAM 136.

Step S764: The flash I/F 139 is driven to transmit the last portion of the protected data, the associated metadata, the associated CRC and the associated ECC to the flash module 150 through the designated I/O channel. It is to be noted that the processing unit 134 may immediately jump to perform other tasks (for example, performing the designated encoding algorithm) without waiting for the actual transmission operation to be completed after driving the flash I/F 139.

Step S766: The flash I/F 139 is driven to issue the command to the flash module 150 to start the actual programming operation. It is to be noted that the processing unit 134 may immediately jump to perform other tasks (for example, performing the designated encoding algorithm) without waiting for the actual programming operation to be completed after driving the flash I/F 139. After the programming operation completes, the processing unit 139 updates the mapping table temporarily stored in the RAM 136 to modify the physical address that is mapped for the LBAs of the last portion of the protected data. It is not necessary to drive the flash I/F 139 by the processing unit 134 to program the mapping table temporarily stored in the RAM 136 into the designated address of the flash module 150 after the mapping table in the RAM 136 is updated for the last portion of the protected data. Under regular situations, the processing unit 134 drives the flash I/F 139 to program the mapping table temporarily stored in the RAM 136 into the designated physical address of the flash module 150 after this current block is filled with data. It is to be noted that, the protected data is considered to be safely stored in the flash module 150 only after the mapping table in the RAM 136 is programmed into the designated physical address of the flash module 150.

Refer to FIG. 6. Assume that one authenticated data write command instructs the flash controller 130 to write 64K bytes of protected data and one physical page in the flash module 150 can store 4 LBAs (that is, 16K bytes) of the protected data: The flash controller 130 when executing the authenticated data write command programs the 64K bytes of the protected data into four physical pages of the designated current blocks in the flash module 150. In step S730, the index of the first physical page is 0, the index of the second one is 1, and so on. The write page count MAXpg is set to 4.

The processing unit 134 executes step S710 in the time period 622. Subsequently, for the first portion of the protected data, the processing unit 134 executes steps S720, S730, S740 and S752 sequentially in the time period 631 and executes step S754 in the time period 642. Subsequently, for the second portion of the protected data, the processing unit 134 executes steps S756, S758, S730, S740 and S752 sequentially in the time period 651 and executes step S754 in the time period 662. Subsequently, for the third portion of the protected data, the processing unit 134 executes steps S756, S758, S730, S740 and S752 sequentially in the time period 633 and executes step S754 in the time period 644. Subsequently, for the last portion of the protected data, the processing unit 134 executes steps S756, S758, S730, S740, S762 and S764 sequentially in the time period 653 and executes step S766 in the time period 664. If the processing unit 134 discovers that the MAC sent from the host side 110 is the same as the MAC calculated in the device side 400 in the time period $t_{CMP}$, the metadata associated with the last portion of the protected data includes information of successful authentication. Otherwise, the metadata associated with the last portion of the protected data includes information of failed authentication. The metadata associated with the last portion of the protected data may include an authentication flag in one bit to indicate whether the authentication for the whole protected data is successful or failed.

Accompanying with the method for programming protected data, as shown in FIG. 7, refer to FIG. 8 showing the flowchart of the method for reconstructing the protected data in the SPOR procedure. The method is performed by the processing unit 134 when loading and executing the program code of the FTL. The details are as follows:

Step S810: The flash I/F 139 is driven to read the mapping table associated with the protected data from the flash module 150 and the mapping table is stored in the designated address of the RAM 136.

Step S820: The last success-programmed page before SPO is found from one or more current blocks for storing the protected data in the flash module 150. The processing unit 134 may scan forward starting from the last physical page in the current block used to store the protected data in the flash module 150 to repeatedly read the protected data, the metadata, the CRC and the ECC from each physical page until the last success-programmed page before SPO is found. For each iteration of reading, the processing unit 134 checks whether the raw protected data and the raw metadata can pass the preliminary examination with the CRC. If they pass the preliminary examination, then this physical page is identified as the last success-programmed page before SPO. If they fail to pass the preliminary examination, then the ECC is used to correct error bits in the raw protected data and the raw metadata to generate corrected protected data and corrected metadata. Next, the processing unit checks whether the corrected protected data and the corrected metadata can pass the re-examination with the CRC. If they pass the re-examination, then this physical page is identified as the last success-programmed page before SPO. If they fail to pass the re-examination, then this physical page is labeled as an uncorrectable ECC (UECC) page.

Step S830: The page index idx and the write page count MAXpg are obtained from the last success-programmed page before SPO.

Step S840: It is determined whether the page index idx equals the write page count MAXpg minus one. If so, it means that the last success-programmed page before SPO is the last physical page for one data write command, and the process proceeds to step S850. Otherwise, the process proceeds to step S870.

Step S850: It is determined whether the metadata contains information about the successful authentication. If so, the process proceeds to step S860. Otherwise, the process proceeds to step S870.

Step S860: The mapping table stored in the RAM 136 is updated. The processing unit 134 drives the flash I/F 139 to read the other physical pages for this data write command from the flash module 150. The mapping table is updated according to the physical addresses of the last success-programmed page before SPO, and the other physical pages for storing the protected data instructed by this data write command, and the LBAs recorded in the metadata of the last success-programmed page before SPO, and the other physical pages for storing the protected data instructed by this data write command. Subsequently, the flash I/F 139 is driven to program the updated mapping table stored in the RAM into the designated address of the flash module 150 to reflect the status of the whole protected data that has passed the authentication and has been programmed into the flash module 150 before SPO. In other words, after the updated mapping table is successfully programmed into the flash module 150, the protected data that was programmed into the flash module 150 before SPO is successfully recovered.

Step S870: The updated mapping table stored in the RAM 136 is not updated for the last success-programmed page before SPO and the other physical pages for storing the protected data instructed by this data write command, so that the whole protected data that does not pass the authentication cannot not be successfully programmed into the flash module 150.

Figure 9:
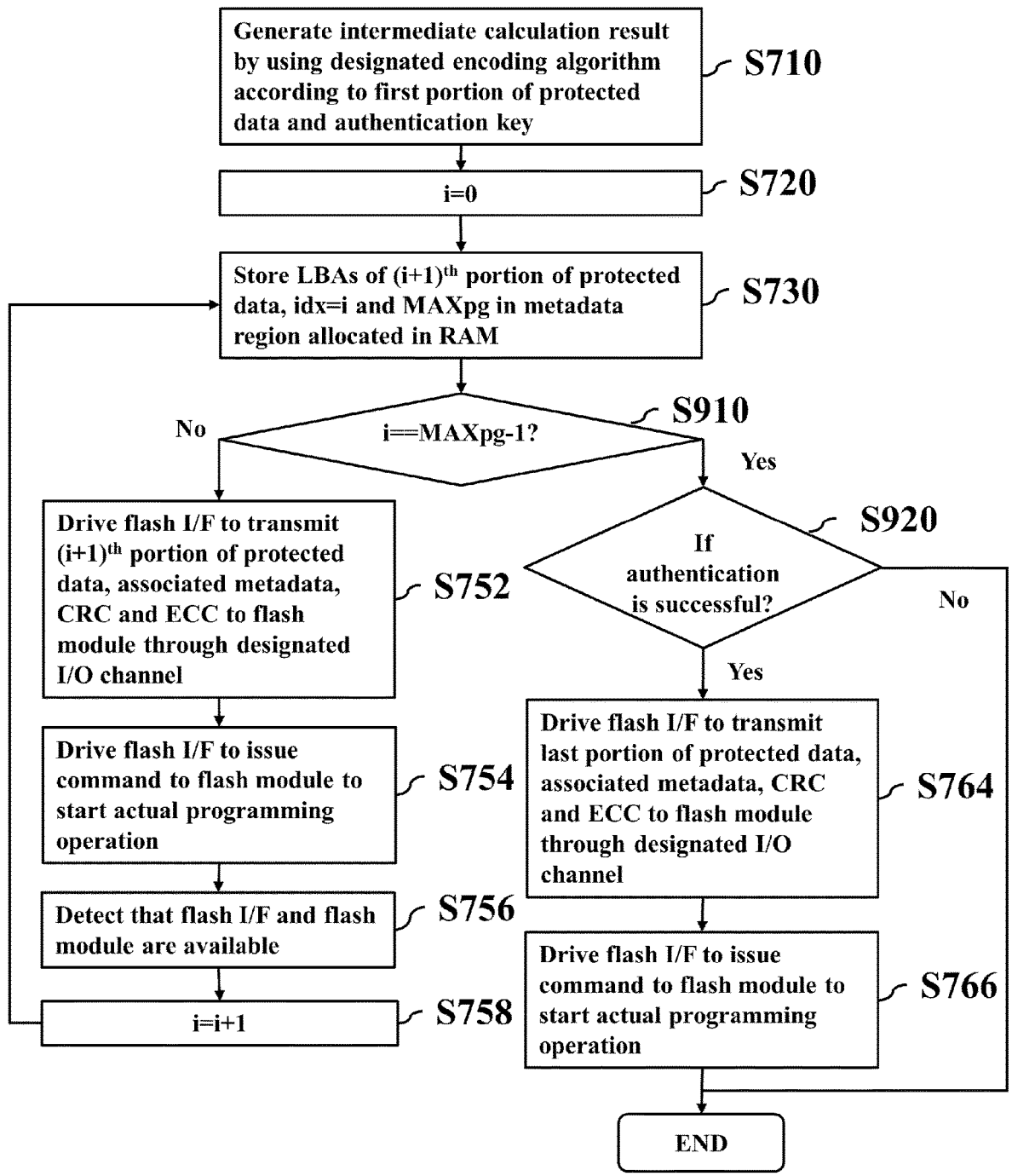
FIG. 9 is a flowchart illustrating a method for programming protected data according to an embodiment of the invention.

In alternative embodiments, the present invention further introduces the method for programming protected data, as shown in FIG. 9, and the method for reconstructing the protected data in the SPOR procedure in the SPOR procedure. Similarly, each physical page reserves some space for the processing unit 134 to store metadata, a CRC and an ECC. To ensure the security of the protected data for one data write command (e.g. authenticated data write command), the processing unit 134 stores the total number of programmed pages and this page index in the metadata of each physical page, but does not store an authentication result for the entire protected data in the metadata of the last physical page.

Refer to FIG. 9 showing the flowchart of the method for programming protected data, which is performed by the processing unit 134 when loading the executed the program code of the FTL. The technical details of steps S710, S720, S730, S752, S754, S756, S758, S764 and S766 in FIG. 9 are substantially the same as those in FIG. 7 and will not be described again for the sake of brevity. The method shown in FIG. 9 does not perform step S762 in FIG. 7. The technical details contained in FIG. 9 that are different from FIG. 7 are described as follows:

Step S910: It is determined whether the variable i equals the write page count MAXpg minus one. If so, it means that the physical page to be programmed in this iteration is the last physical page for this data write command (i.e. the data to be programmed in this iteration is the last portion of the protected data), and the process proceeds to step S920. Otherwise, the process proceeds to step S752.

Step S920: It is determined whether the authentication for the entire protected data is successful. If so, the process proceeds to step S764. Otherwise, the process ends and does not program the last portion of the protected data into the flash module 150.

The actual executions of the method for programming protected data, as shown in FIG. 9, can also be referred to FIG. 6, and the assumptions can be referred to the related description in the above paragraphs. For the steps performed by the processing unit 134 in the time periods 631, 642, 651, 662, 633 and 644, reference can be made to the descriptions in the related paragraphs as above, which will not be repeated herein for the brevity. If the whole protected data has passed the authentication, for the last portion of the protected data, the processing unit 134 executes steps S756, S758, S730, S910, S920 and S764 sequentially in the time period 653 and executes step S766 in the time period 664. It is to be noted that, since FIG. 9 excludes step S762 as shown in FIG. 7, the programmed metadata associated with the last portion of the protected data in step S766 does not contain the authentication result.

Figure 10:
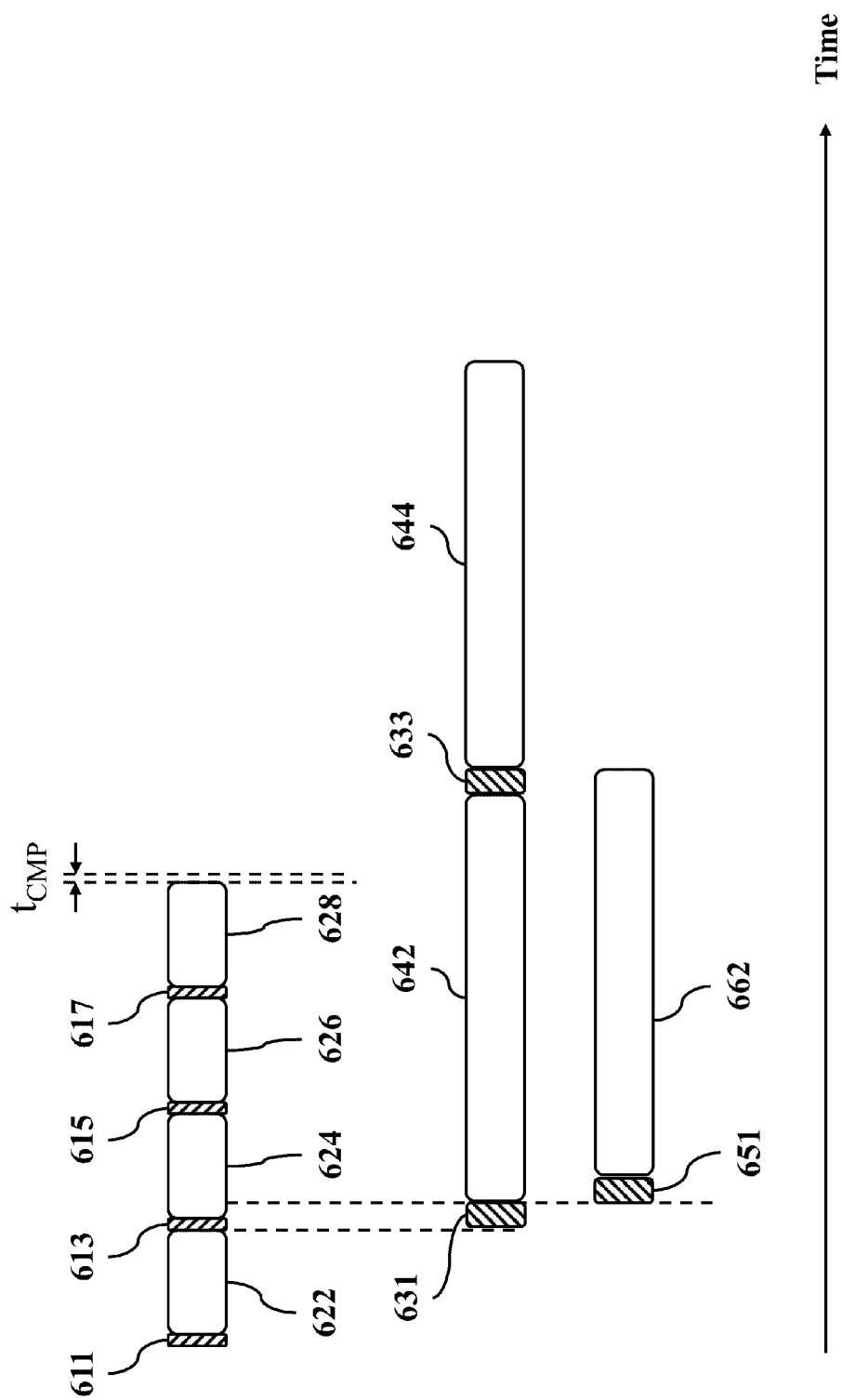
FIG. 10 is a schematic diagram for calculating a MAC and programming protected data in parallel according to an embodiment of the invention.

If the entire protected data cannot pass the authentication, the programming for the protected data refers to the schematic diagram as shown in FIG. 10. Compared with FIG. 6, FIG. 10 lacks the time periods 653 and 664.

Figure 11:
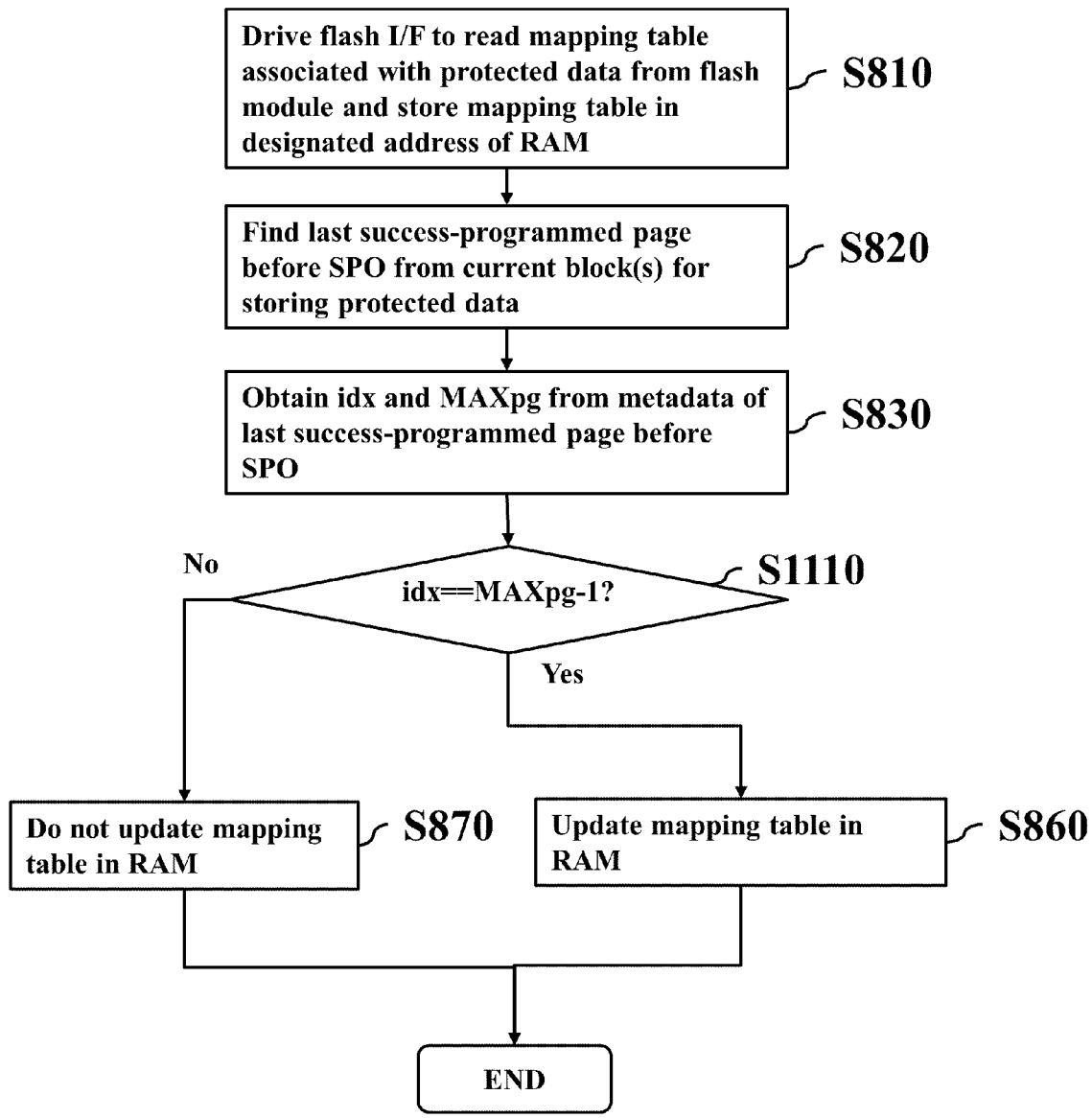
FIG. 11 is a flowchart illustrating a method for reconstructing protected data in a SPOR procedure, which is adapted to FIG. 9, according to an embodiment of the invention.

Accompanying with the method for programming protected data, as shown in FIG. 9, refer to FIG. 11 showing the flowchart of the method for reconstructing the protected data in the SPOR procedure. The technical details of steps S810, S820, S830, S860 and S870 in FIG. 11 are substantially the same as those in FIG. 8 and will not be described again for the sake of brevity. Since the metadata of the last physical page does not include the authentication result for the entire protected data, the method shown in FIG. 11 does not perform step S850 in FIG. 8. The technical details contained in FIG. 11 that are different from FIG. 8 are described as follows:

Step S1110: It is determined whether the page index idx equals the write page count MAXpg minus one. If so, it means that the last success-programmed page before SPO is the last physical page for one data write command (that is, the data programmed into the last success-programmed page before SPO is the last portion of the protected data), and the process proceeds to step S860. Otherwise, the process proceeds to step S870.

Figure 12:
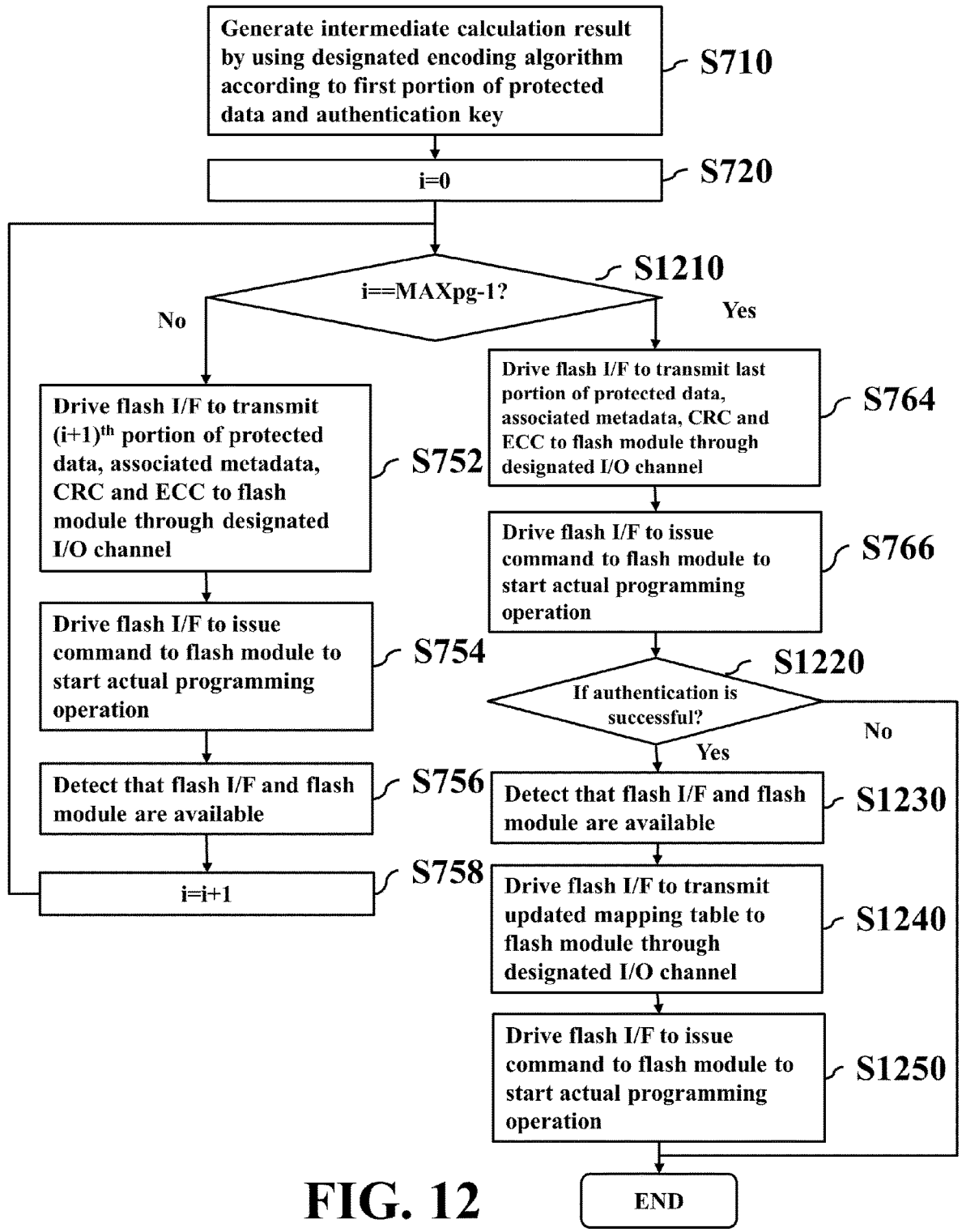
FIG. 12 is a flowchart illustrating a method for programming protected data according to an embodiment of the invention.

In alternative embodiments, the present invention further introduces the method for programming protected data, as shown in FIG. 12. Similarly, each physical page reserves some space for the processing unit 134 to store metadata, a CRC and an ECC. However, the processing unit 134 does not store any information about the security of the protected data in the metadata.

Refer to FIG. 12 showing the flowchart of the method for programming protected data, which is performed by the processing unit 134 when loading the executed the program code of the FTL. The technical details of steps S710, S720, S752, S754, S756, S758, S764 and S766 in FIG. 12 are substantially the same as those in FIG. 7 and will not be described again for the sake of brevity. The method shown in FIG. 12 does not perform steps S730 and S762 in FIG. 7. The technical details contained in FIG. 12 that are different from FIG. 7 are described as follows:

Step S1210: It is determined whether the variable i equals the write page count MAXpg minus one. If so, it means that the physical page to be programmed in this iteration is the last physical page for this data write command (i.e. the data to be programmed in this iteration is the last portion of the protected data), and the process proceeds to step S764. Otherwise, the process proceeds to step S752.

Step S1220: It is determined whether the authentication for the entire protected data is successful after the flash I/F 139 is driven to issue the command to the flash module 150 to start the actual programming operation for the last portion of the protected data. If so, the process proceeds to step S1230. Otherwise, the process ends and does not program the updated mapping table into the flash module 150. It is to be noted that, if the updated mapping table is not programmed into the flash module 150, then the flash module 150 only retains the previous version of the mapping table, causing that, even if the protected data is programmed into the flash module 150, the programmed protected data cannot be read out.

Step S1230: It is detected that the flash I/F 139 and the flash module 150 are available.

Step S1240: The flash I/F 139 is driven to transmit the updated mapping table in the RAM 136 to the flash module 150 through the designated I/O channel. It is to be noted that the processing unit 134 may immediately jump to perform other tasks without waiting for the actual transmission operation to be completed after driving the flash I/F 139.

Step S1250: The flash I/F 139 is driven to issue the command to the flash module 150 to start the actual programming operation. It is to be noted that the processing unit 134 may immediately jump to perform other tasks without waiting for the actual programming operation to be completed after driving the flash I/F 139.

Figure 13:
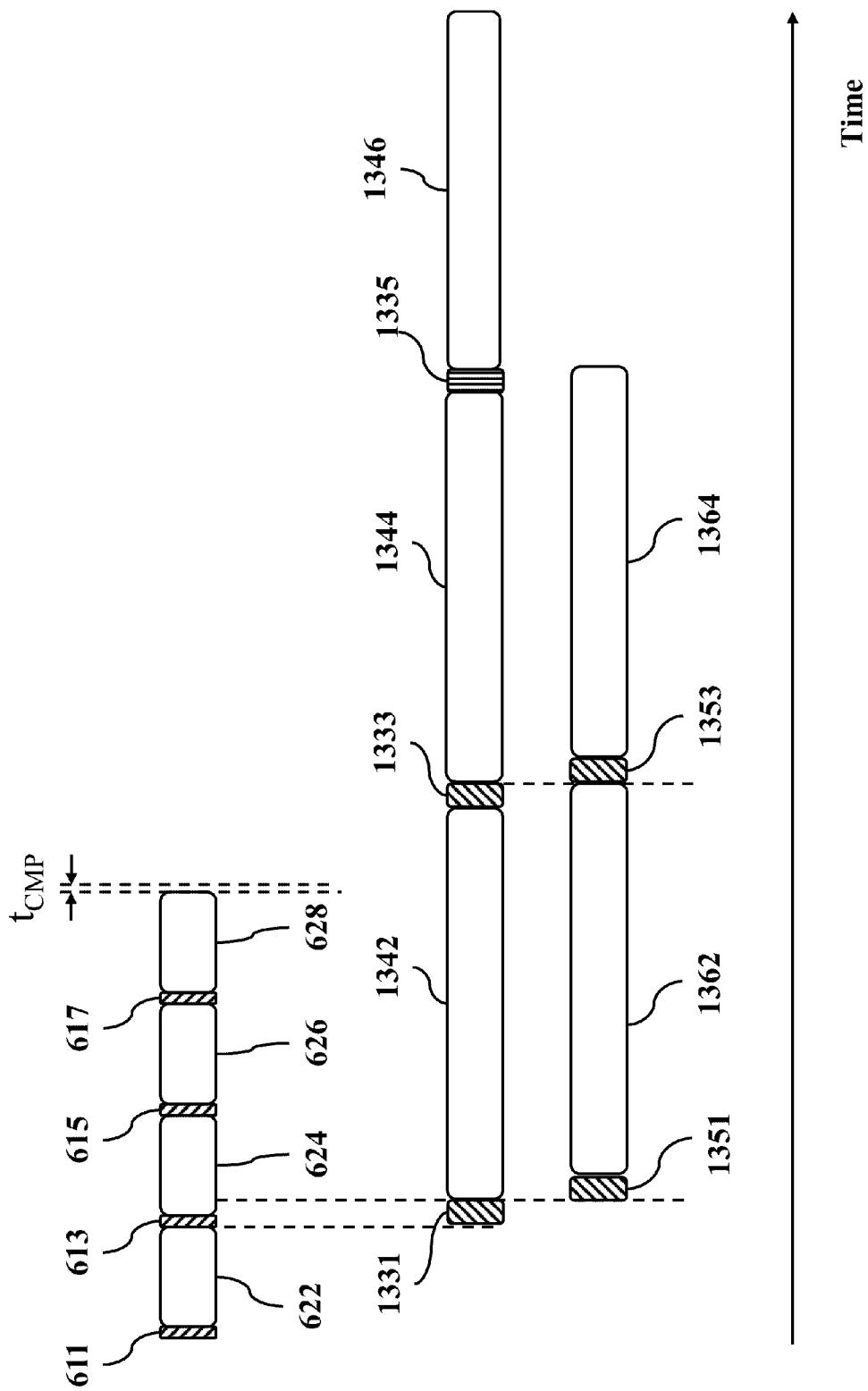
FIG. 13 is a schematic diagram for calculating a MAC and programming protected data and a Host-address To Flash-address mapping (H2F) table in parallel according to an embodiment of the invention.

Refer to FIG. 13 showing the schematic diagram for programming protected data. Assume that one authenticated data write command instructs the flash controller 130 to write 64K bytes of protected data and one physical page in the flash module 150 can store 4 LBAs (that is, 16K bytes) of the protected data: The flash controller 130 when executing the authenticated data write command programs the 64K bytes of the protected data into four physical pages of the designated current blocks in the flash module 150.

The operations performed by the processing unit 134 in the time periods 611, 613, 615, 617, 622, 624, 626 and 628 may refer to the descriptions of the paragraphs described above, and are not repeated herein for brevity. The processing unit 134 executes step S710 in the time period 622. Subsequently, for the first portion of the protected data, the processing unit 134 executes steps S720, S1210 and S752 sequentially in the time period 1331, and executed step S754 in the time period 1342. Subsequently, for the second portion of the protected data, the processing unit 134 executes steps S756, S758, S1210 and S752 sequentially in the time period 1351, and executed step S754 in the time period 1362. Subsequently, for the third portion of the protected data, the processing unit 134 executes steps S756, S758, S1210 and S752 sequentially in the time period 1333, and executed step S754 in the time period 1344. Subsequently, for the last portion of the protected data, the processing unit 134 executes steps S756, S758, S1210 and S764 sequentially in the time period 1353, and executed step S766 in the time period 1364. When discovering that the MAC received from the host side 110 is the same as the MAC calculated in the device side 400, the processing unit 134 executes steps S1230 and S1240 sequentially in the time period 1335 and executes step S1250 in the time period 1346.

Accompanying with the method for programming protected data, as shown in FIG. 12, the SPOR procedure does not implement any method for reconstructing the protected data because all valid records in the mapping table for the protected data would not associate with the protected data that hasn't passed the authentication.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1 to 3, it should be noted that additional elements may be included to achieve better performance without departing from the spirit of the invention. Each element of FIGS. 1 to 3 is composed of various circuits and arranged to operably perform the aforementioned operations. While the process flows described in FIGS. 7-9 and 11-12 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for programming and recovering protected data, performed by a processing unit, comprising:
receiving protected data instructed by a data write command from a host side in a plurality of batches; and
after using an encoding algorithm to generate an intermediate calculation result according to a first portion of the protected data, and an authentication key, arranging a plurality of authentication calculation operations for remaining portions of the protected data, and a plurality of data programming operations for all portions of the protected data, thereby enabling the authentication calculation operations to be performed in parallel to the data programming operations, wherein the authentication calculation operations are performed to calculate a first message authentication code (MAC) using the encoding algorithm according to the intermediate calculation result, the remaining portions of the protected data and the authentication key, and each data programming operation is performed to program a corresponding portion of the protected data and a metadata associated with the corresponding portion of the protected data into a current block of a flash module,
wherein the metadata associated with the corresponding portion of the protected data comprises information about whether the protected data has passed an authentication, which is referred by a sudden power off recovery (SPOR) procedure.

2. The method of claim 1, wherein the data write command is a COMMAND UFS Protocol Information Unit (UPIU), the COMMAND UPIU comprises an operation code of "SECURITY PROTOCOL OUT" and an Extra Header Segment (EHS) field, and a request type of the EHS field is an authenticated data write request.

3. The method of claim 2, wherein a length of each portion of the protected data is 16K bytes.

4. The method of claim 1, comprising:
recording information indicating that this is not the last portion of the protected data in a first metadata that is not associated with the last portion of the protected data;
programming portions of the protected data other than the last portion of the protected data, and the first metadata into the current block of the flash module;
when the first MAC is the same as a second MAC carried in the data write command, recording information indicating that this is the last portion of the protected data and the protected data has passed the authentication in a second metadata associated with the last portion of the protected data;
when the first MAC is different from the second MAC carried in the data write command, recording information indicating that this is the last portion of the protected data and the protected data hasn't passed the authentication in the second metadata associated with the last portion of the protected data; and
programming the last portion of the protected data, and the second metadata into the current block of the flash module.

5. The method of claim 4, comprising:
finding a last success-programmed page before sudden power off (SPO) from the flash module in the SPOR procedure;
when a third metadata comprises information indicating that this is not the last portion of the protected data, or this is the last portion of the protected data and the protected data hasn't passed the authentication, not updating a host-address to flash-address mapping (H2F) table associated with the protected data; and
when the third metadata comprises information indicating that this is the last portion of the protected data and the protected data has passed the authentication, updating the H2F table associated with the protected data according to physical addresses of all physical pages in the flash module that stores the protected data for the data write command, and logical addresses recorded in the metadata of the all physical pages, and programming an updated H2F table into the flash module to reflect a status of the protected data that has been programmed into the flash module before SPO.

6. The method of claim 1, comprising:
recording information indicating that this is not the last portion of the protected data in a first metadata that is not associated with the last portion of the protected data;
programming portions of the protected data other than the last portion of the protected data, and the first metadata into the current block of the flash module;
when the first MAC is the same as a second MAC carried in the data write command, programming the last portion of the protected data, and a second metadata associated with the last portion of the protected data into the current block of the flash module, wherein the second metadata comprises information indicating that this is the last portion of the protected data; and when the first MAC is different from the second MAC carried in the data write command, not programming the last portion of the protected data, and the second metadata associated with the last portion of the protected data into the current block of the flash module.

7. The method of claim 6, comprising:

finding a last success-programmed page before sudden power off (SPO) from the flash module in the SPOR procedure;

when a third metadata comprises information indicating that this is not the last portion of the protected data, not updating a host-address to flash-address mapping (H2F) table associated with the protected data; and when the third metadata comprises information indicating that this is the last portion of the protected data, updating the H2F table associated with the protected data according to physical addresses of all physical pages in the flash module that stores the protected data for the data write command, and logical addresses recorded in the metadata of the all physical pages, and programming an updated H2F table into the flash module to reflect a status of the protected data that has been programmed into the flash module before SPO.

8. A non-transitory computer-readable storage medium having stored therein program code that, when loaded and executed by a processing unit, causes the processing unit to:

receive protected data instructed by a data write command from a host side in a plurality of batches; and after using an encoding algorithm to generate an intermediate calculation result according to a first portion of the protected data, and an authentication key, arrange a plurality of authentication calculation operations for remaining portions of the protected data, and a plurality of data programming operations for all portions of the protected data, thereby enabling the authentication calculation operations to be performed in parallel to the data programming operations, wherein the authentication calculation operations are performed to calculate a first message authentication code (MAC) using the encoding algorithm according to the intermediate calculation result, the remaining portions of the protected data and the authentication key, and each data programming operation is performed to program a corresponding portion of the protected data and a metadata associated with the corresponding portion of the protected data into a current block of a flash module, wherein the metadata associated with the corresponding portion of the protected data comprises information about whether the protected data has passed an authentication, which is referred by a sudden power off recovery (SPOR) procedure.

9. The non-transitory computer-readable storage medium of claim 8, wherein the data write command is a COMMAND UFS Protocol Information Unit (UPIU), the COMMAND UPIU comprises an operation code of "SECURITY PROTOCOL OUT" and an Extra Header Segment (EHS) field, a request type of the EHS field is an authenticated data write request, and a length of each portion of the protected data is 16K bytes.

10. The non-transitory computer-readable storage medium of claim 8, wherein the program code that, when loaded and executed by the processing unit, causes the processing unit to:

record information indicating that this is not the last portion of the protected data in a first metadata that is not associated with the last portion of the protected data;

program portions of the protected data other than the last portion of the protected data, and the first metadata into the current block of the flash module;

when the first MAC is the same as a second MAC carried in the data write command, record information indicating that this is the last portion of the protected data and the protected data has passed the authentication in a second metadata associated with the last portion of the protected data;

when the first MAC is different from the second MAC carried in the data write command, record information indicating that this is the last portion of the protected data and the protected data hasn't passed the authentication in the second metadata associated with the last portion of the protected data; and program the last portion of the protected data, and the second metadata into the current block of the flash module.

11. The non-transitory computer-readable storage medium of claim 10, wherein the program code that, when loaded and executed by the processing unit, causes the processing unit to:

find a last success-programmed page before sudden power off (SPO) from the flash module in the SPOR procedure;

when a third metadata comprises information indicating that this is not the last portion of the protected data, or this is the last portion of the protected data and the protected data hasn't passed the authentication, not to update a host-address to flash-address mapping (H2F) table associated with the protected data; and when the third metadata comprises information indicating that this is the last portion of the protected data and the protected data has passed the authentication, update the H2F table associated with the protected data according to physical addresses of all physical pages in the flash module that stores the protected data for the data write command, and logical addresses recorded in the metadata of the all physical pages, and program an updated H2F table into the flash module to reflect a status of the protected data that has been programmed into the flash module before SPO.

12. The non-transitory computer-readable storage medium of claim 8, wherein the program code that, when loaded and executed by the processing unit, causes the processing unit to:

record information indicating that this is not the last portion of the protected data in a first metadata that is not associated with the last portion of the protected data;

program portions of the protected data other than the last portion of the protected data, and the first metadata into the current block of the flash module;

when the first MAC is the same as a second MAC carried in the data write command, program the last portion of the protected data, and a second metadata associated with the last portion of the protected data into the current block of the flash module, wherein the second metadata comprises information indicating that this is the last portion of the protected data; and when the first MAC is different from the second MAC carried in the data write command, not to program the last portion of the protected data, and the second metadata associated with the last portion of the protected data into the current block of the flash module.

13. The non-transitory computer-readable storage medium of claim 12, wherein the program code that, when loaded and executed by the processing unit, causes the processing unit to:

find a last success-programmed page before sudden power off (SPO) from the flash module in the SPOR procedure;

when a third metadata comprises information indicating that this is not the last portion of the protected data, not to update a host-address to flash-address mapping (H2F) table associated with the protected data; and when the third metadata comprises information indicating that this is the last portion of the protected data, update the H2F table associated with the protected data according to physical addresses of all physical pages in the flash module that stores the protected data for the data write command, and logical addresses recorded in the metadata of the all physical pages, and program an updated H2F table into the flash module to reflect a status of the protected data that has been programmed into the flash module before SPO.

14. An apparatus for programming and recovering protected data, comprising:

a host interface (I/F), coupled to a host side;

a flash I/F, coupled to a flash module; and a processing unit, coupled to the host I/F and the flash I/F, arranged operably to: drive the host I/F to receive protected data instructed by a data write command from the host side in a plurality of batches; and after using an encoding algorithm to generate an intermediate calculation result according to a first portion of the protected data, and an authentication key, arrange a plurality of authentication calculation operations for remaining portions of the protected data, and a plurality of data programming operations for all portions of the protected data, thereby enabling the authentication calculation operations to be performed in parallel to the data programming operations, wherein the authentication calculation operations are performed to calculate a first message authentication code (MAC) using the encoding algorithm according to the intermediate calculation result, the remaining portions of the protected data and the authentication key, and each data programming operation is performed to program a corresponding portion of the protected data and a metadata associated with the corresponding portion of the protected data into a current block of a flash module, wherein the metadata associated with the corresponding portion of the protected data comprises information about whether the protected data has passed an authentication, which is referred by a sudden power off recovery (SPOR) procedure.

15. The apparatus of claim 14, wherein the data write command is a COMMAND UFS Protocol Information Unit (UPIU), the COMMAND UPIU comprises an operation code of "SECURITY PROTOCOL OUT" and an Extra Header Segment (EHS) field, and a request type of the EHS field is an authenticated data write request.

16. The apparatus of claim 15, wherein a length of each portion of the protected data is 16K bytes.

17. The apparatus of claim 14, wherein the processing unit is arranged operably to: record information indicating that this is not the last portion of the protected data in a first metadata that is not associated with the last portion of the protected data; drive the flash I/F to program portions of the protected data other than the last portion of the protected data, and the first metadata into the current block of the flash module; when the first MAC is the same as a second MAC carried in the data write command, record information indicating that this is the last portion of the protected data and the protected data has passed the authentication in a second metadata associated with the last portion of the protected data; when the first MAC is different from the second MAC carried in the data write command, record information indicating that this is the last portion of the protected data and the protected data hasn't passed the authentication in the second metadata associated with the last portion of the protected data; and drive the flash I/F to program the last portion of the protected data, and the second metadata into the current block of the flash module.

18. The apparatus of claim 17, wherein the processing unit is arranged operably to: drive the flash I/F to find a last success-programmed page before sudden power off (SPO) from the flash module in the SPOR procedure; when a third metadata comprises information indicating that this is not the last portion of the protected data, or this is the last portion of the protected data and the protected data hasn't passed the authentication, not to update a host-address to flash-address mapping (H2F) table associated with the protected data; and when the third metadata comprises information indicating that this is the last portion of the protected data and the protected data has passed the authentication, update the H2F table associated with the protected data according to physical addresses of all physical pages in the flash module that stores the protected data for the data write command, and logical addresses recorded in the metadata of the all physical pages, and drive the flash I/F to program an updated H2F table into the flash module to reflect a status of the protected data that has been programmed into the flash module before SPO.

19. The apparatus of claim 14, wherein the processing unit is arranged operably to: record information indicating that this is not the last portion of the protected data in a first metadata that is not associated with the last portion of the protected data; drive the flash I/F to program portions of the protected data other than the last portion of the protected data, and the first metadata into the current block of the flash module; when the first MAC is the same as a second MAC carried in the data write command, drive the flash I/F to program the last portion of the protected data, and a second metadata associated with the last portion of the protected data into the current block of the flash module, wherein the second metadata comprises information indicating that this is the last portion of the protected data; and when the first MAC is different from the second MAC carried in the data write command, not to program the last portion of the protected data, and the second metadata associated with the last portion of the protected data into the current block of the flash module.

20. The apparatus of claim 19, wherein the processing unit is arranged operably to: drive the flash I/F to find a last success-programmed page before sudden power off (SPO) from the flash module in the SPOR procedure; when a third metadata comprises information indicating that this is not the last portion of the protected data, not to update a host-address to flash-address mapping (H2F) table associated with the protected data; and when the third metadata comprises information indicating that this is the last portion of the protected data, update the H2F table associated with the protected data according to physical addresses of all physical pages in the flash module that stores the protected data for the data write command, and logical addresses recorded in the metadata of the all physical pages, and drive the flash I/F to program an updated H2F table into the flash module to reflect a status of the protected data that has been programmed into the flash module before SPO.

* * * * *